(12) United States Patent
Velikov et al.

(10) Patent No.: US 12,357,011 B2
(45) Date of Patent: Jul. 15, 2025

(54) TREATMENT OF BRAN FROM THE SEEDS OF BLACK MUSTARD OR BROWN INDIAN MUSTARD AND USE OF THE TREATED BRAN IN FOOD PRODUCTS

(71) Applicant: Conopco Inc., Englewood Cliffs, NJ (US)

(72) Inventors: Krassimir Petkov Velikov, Vlaardingen (NL); Francesco Donsi, Fisciano (IT)

(73) Assignee: Conopco Inc., Englewood Cliffs, NJ (US)

( * ) Notice: Subject to any disclaimer, the term of this patent is extended or adjusted under 35 U.S.C. 154(b) by 676 days.

(21) Appl. No.: 16/483,762

(22) PCT Filed: Jan. 26, 2018

(86) PCT No.: PCT/EP2018/051957
§ 371 (c)(1),
(2) Date: Aug. 6, 2019

(87) PCT Pub. No.: WO2018/153614
PCT Pub. Date: Aug. 30, 2018

(65) Prior Publication Data
US 2019/0364941 A1 Dec. 5, 2019

(30) Foreign Application Priority Data
Feb. 23, 2017 (EP) .................... 17157545

(51) Int. Cl.
*A23L 27/18* (2016.01)
*A23L 25/00* (2016.01)
*A23L 27/60* (2016.01)

(52) U.S. Cl.
CPC ............... *A23L 27/18* (2016.08); *A23L 25/30* (2016.08); *A23L 27/60* (2016.08); *A23V 2002/00* (2013.01)

(58) Field of Classification Search
CPC .......... A23L 25/30; A23L 27/10; A23L 27/45; A23L 27/18; A23L 27/60; A23L 33/185; A23V 2002/00
USPC ........................................ 426/629
See application file for complete search history.

(56) References Cited

U.S. PATENT DOCUMENTS

| | | |
|---|---|---|
| 1,883,367 A | 10/1932 | Gray |
| 3,630,757 A | 12/1971 | Meid |
| 3,852,488 A | 12/1974 | Yoda |
| 3,878,195 A | 4/1975 | Taillie et al. |
| 4,062,979 A | 12/1977 | Haak |
| 4,496,598 A | 1/1985 | Sakai et al. |
| 5,023,105 A | 6/1991 | Warseck |
| 6,194,016 B1 | 2/2001 | Cui et al. |
| 2006/0029703 A1* | 2/2006 | Shah ............. A23L 33/22 426/518 |
| 2007/0128322 A1 | 6/2007 | Haapianen et al. |
| 2014/0242220 A1 | 8/2014 | Chen et al. |
| 2015/0173408 A1 | 6/2015 | Zhao et al. |
| 2017/0049140 A1 | 2/2017 | Regismond et al. |
| 2019/0364941 A1 | 12/2019 | Velikov et al. |

FOREIGN PATENT DOCUMENTS

| | | | |
|---|---|---|---|
| EP | 1623633 A2 | 2/2006 | |
| EP | 2745711 A1 * | 6/2014 | ........... A23D 7/0053 |
| EP | 2585186 | 1/2017 | |
| FR | 2793997 A1 | 12/2000 | |
| GB | 1286370 A | 8/1972 | |
| RU | 2340660 C1 | 12/2008 | |
| RU | 2007115492 | 12/2008 | |
| WO | WO2011107760 | 9/2011 | |
| WO | 2013092086 A1 | 6/2013 | |
| WO | WO2013092086 | 6/2013 | |

(Continued)

OTHER PUBLICATIONS

NPL Volume weight mean diameter (Retrieved on Mar. 7, 2022) . . . (Year: 2022).*
NPL Kjeldahl (2000, see last page) (Year: 2000).*
Particle Grinding vs High Pressure Homogenizing by NPL Shechter on (2016 ) [A 2013 article by Sushant et al. ] (Year: 2016).*
NPL Nekkanti et al. (in Drug Nanoparticles—An overview, chapter 6, pp. 111-132, 2012) (Year: 2012).*
J. R. Vose, "Chemical and Physical Studies of Mustard and Rapeseed Coats", Cereal Chemistry 1974, vol. 51, No. 5, p. 658-665.
Ch. Gerhards and F. Walker*, "Rheological properties of mustard raw and from processed mustard", Nahrung vol. 41 (1997), Nr. 2, S. 96-100.

*Primary Examiner* — Erik Kashnikow
*Assistant Examiner* — Bhaskar Mukhopadhyay
(74) *Attorney, Agent, or Firm* — N.V. Nederlandsch Octrooibureau

(57) ABSTRACT

The present invention relates to a process for the manufacture of a suspension of mustard bran particles comprising the following steps:
  a) providing an aqueous dispersion of mustard bran particles originating from the seeds of black mustard (*Brassica nigra*) and/or the seeds of brown Indian mustard (*Brassica juncea*), said mustard bran particles having a volume weighted mean diameter of more than 300 μm;
  b) producing a milled suspension of mustard bran particles by passing the dispersion one or more times through a high shear device selected from a high pressure homogenizer and an ultra-fine friction grinder, said high pressure homogenizer being operated at a pressure drop of at least 100 bar.
Treatment of these types of mustard bran in a high shear device increases overall bioaccessibility of the proteins contained in the bran. This is desirable in view of the high nutritional value of these proteins.
The invention also provides a food product comprising an aqueous phase, said aqueous phase comprising 0.5 to 15 wt. % of mustard bran particles originating from the seeds of black mustard and/or the seeds of brown Indian mustard, said mustard bran particles having a volume weighted mean diameter of less than 600 μm.

12 Claims, No Drawings

(56) References Cited

FOREIGN PATENT DOCUMENTS

| WO | 2015169527 A1 | 11/2015 |
|----|---------------|---------|
| WO | WO2017080872  | 5/2017  |
| WO | WO2018153614  | 8/2018  |

* cited by examiner

TREATMENT OF BRAN FROM THE SEEDS OF BLACK MUSTARD OR BROWN INDIAN MUSTARD AND USE OF THE TREATED BRAN IN FOOD PRODUCTS

FIELD OF THE INVENTION

The present invention relates to the treatment of bran from the seeds of black mustard (*Brassica nigra*) and/or the seeds of brown Indian mustard (*Brassica juncea*), and to the use of the treated mustard bran in food products.

BACKGROUND TO THE INVENTION

Mustard seeds are an important ingredient in foods. They are the prime source for mustard, but also used as spice to prepare other foods such as mayonnaise. Various plant species provide mustard seeds: *Sinapis alba* and *Brassica hirta* (white and yellow mustard), *Brassica juncea* (brown Indian mustard or oriental mustard), and *Brassica nigra* (black mustard).

When mustard seeds are ground to powder in a mill, the seed hulls separate out as mustard bran. Although, typically discarded as waste product, some commercial foods (like sauces) comprise mustard bran from white or yellow mustard as an ingredient. Mustard bran from these mustard varieties contains mucilage and can structure foods by affecting viscosity and water binding properties. Mustard bran is (commercially) available in particulate (powdered) form.

Mustard bran obtained from the milling of seeds of black mustard or brown Indian mustard has a substantial protein content.

U.S. Pat. No. 3,630,757 describes a method for making an edible food composition having body, taste and mouth feel substantially similar to food products prepared from concentrated dispersions of tomato solids, comprising providing a fluid dispersion of mustard seed hulls, comminuting said fluid mustard seed hull dispersion to provide comminuted mustard seed hulls having a particle size of less than about 500 microns, and mixing said comminuted mustard seed hull dispersion with condiments and a gum so as to provide the edible food composition with body and mouth feel substantially similar to food products prepared from concentrated dispersions of tomato solids. The examples of the U.S. patent describe the preparation of a tomato ketchup-like products in which mustard bran (from *Brassica alba* type mustard) is mixed with vinegar, water, preservatives and spices, and the resulting mixture is twice passed through a colloid mill.

WO 2013/092086 describes an edible oil-in-water emulsion comprising finely ground pulse seed and rhamnogalacturonan mucilage gum originating from mustard bran. The examples of the international patent application describe the preparation of mayonnaise using a process in which ground yellow mustard bran is mixed with water, lentil flour, sugar and salt, and wherein remaining ingredients (oil, vinegar, egg yolk) are admixed using a Silverson mixer or a Fryma Del mixer.

WO 2015/169527 describes an oil-in-water emulsion, comprising ground white or yellow mustard seed, wherein the ground white or yellow mustard seed is obtained by grinding white or yellow mustard seed in the presence of water and vinegar. Example 1 describes the preparation of an oil-in-water emulsion by mixing egg blend, mustard bran and aqueous phase in a pre-emulsion vessel and adding the oil under continuous stirring, followed by passing the pre-emulsion through a colloid mill for emulsification (rotation speeds between 7,000 and 14,000 rpm).

SUMMARY OF THE INVENTION

The inventors have discovered that bran from the seeds of black mustard (*Brassica nigra*) and/or brown Indian mustard (*Brassica juncea*) can advantageously be applied in food products after it has been treated in a high shear device selected from a high pressure homogenizer and/or an ultra-fine friction grinder. More particularly, the inventors have discovered that treatment of this type of mustard bran in a high shear device increases overall bioaccessability of the proteins contained in the bran. This is desirable in view of the high nutritional value of these proteins which provide all the essential amino acids.

Thus, a first aspect of the present invention relates to a process for the manufacture of a suspension of mustard bran particles comprising the following steps:
  a) providing an aqueous dispersion of mustard bran particles originating from the seeds of black mustard (*Brassica nigra*) and/or the seeds of brown Indian mustard (*Brassica juncea*), said mustard bran particles having a volume weighted mean diameter of more than 300 µm;
  b) producing a milled suspension of mustard bran particles by passing the dispersion one or more times through a high shear device selected from a high pressure homogenizer and/or an ultra-fine friction grinder, said high pressure homogenizer being operated at a pressure drop of at least 100 bar.

Without wishing to be bound by theory it is believed that by passing the aqueous dispersion of mustard bran particles one or more times through a high pressure homogenizer and/or an ultra-fine friction grinder, a substantial part of the protein contained in the bran is solubilized. In addition, bioaccessability of a part of the protein that is retained in the bran is improved by the shear treatment in that this protein fraction is rendered accessible by enzymes.

Another aspect of the present invention is an aqueous suspension comprising 0.5 to 15 wt. % of mustard bran particles originating from the seeds of black mustard *Brassica nigra*) and/or brown Indian mustard (*Brassica juncea*), said mustard bran particles having a volume weighted mean diameter of less than 600 µm.

A further aspect of the invention relates to a food product comprising an aqueous phase, said aqueous phase comprising 0.5 to 15 wt. % of mustard bran particles originating from the seeds of black mustard (*Brassica nigra*) and/or brown Indian mustard (*Brassica juncea*), said mustard bran particles having a volume weighted mean diameter of less than 600 µm.

Yet another aspect of the invention relates to method of producing the aforementioned food product, said method comprising mixing the aqueous suspension of the present invention with one or more other food ingredients

DETAILED DESCRIPTION OF THE INVENTION

As explained above, a first aspect of the present invention relates to a process for the manufacture of a suspension of mustard bran particles comprising the following steps:
  a) providing an aqueous dispersion of mustard bran particles originating from the seeds of black mustard (*Brassica nigra*) and/or the seeds of brown Indian mustard (*Brassica juncea*), said mustard bran particles having a volume weighted mean diameter of more than 300 μm;

b) producing a milled suspension of mustard bran particles by passing the dispersion one or more times through a high shear device selected from a high pressure homogenizer and/or an ultra-fine friction grinder, said high pressure homogenizer being operated at a pressure drop of at least 100 bar.

The term "mustard bran" as used herein refers to the seed hull material that can be removed from mustard seed, for instance, by grinding the seed.

The volume weighted mean diameter of the bran particles in aqueous environment can suitably be determined by means of laser diffraction methods (e.g. using a Malvern Mastersizer 2000).

Throughout this document all percentages, unless otherwise stated, refer to the percentage by weight (wt. %).

The term 'oil' as used herein refers to a lipid component selected from triglycerides, diglycerides, monoglycerides, phosphoglycerides and combinations thereof.

The terms 'oil' and 'fat' are used interchangeably. Where applicable the prefix 'liquid' or 'solid' is added to indicate if the fat or oil is liquid or solid at 20° C.

The term 'total Kjeldahl protein' (TKP) content as used herein refers to the protein content that is calculated by multiplying the total Kjeldahl nitrogen content with a factor 6.25.

The high shear device is employed in step b) of the present process to mechanically disintegrate the mustard bran particles that are present in the aqueous dispersion of mustard bran particles.

High pressure homogenizers are devices in which a fluidic product is forced through a narrow gap (the homogenizing nozzle) at high pressure. The product is subjected to very high shear stress causing dispersed particles to disintegrate. Origin of this shear is the sudden restriction of flow under high pressure through a restrictive valve. A high pressure homogenizer consists of a high pressure pump and a homogenizing nozzle. The homogenizing pressure is typically in excess of 50 bar. Ultra high pressure homogenizers are able to reach up to 4000 bars. Microfluidizers are a type of high pressure homogenizer that can be operated are very high pressures (up to approximately 4000 bar).

Ultra-fine friction grinders are devices comprising two ceramic nonporous grinders. The clearance between the upper and lower grinder is adjustable. The clearance between the grinders is important as it determines the size of ground material. An example of an ultra-fine friction grinder is the "Supermasscolloider" that is available from Masuko Sangyo Co., Japan.

In a preferred embodiment of the present process, the aqueous dispersion in step a) contains 0.5 to 80 wt. %, more preferably 1 to 20 wt. % and most preferably 2 to 10 wt. % of the mustard bran particles having a volume weighted mean diameter of more than 300 μm, preferably of more than 500 μm and most preferably of more than 600 μm.

The aqueous dispersion of mustard bran particles that is employed in the present process typically has a water content of at least 20 wt. %, more preferably of at least 80 wt. % and most preferably of at least 85 wt. %.

As explained, the passing of the aqueous dispersion of mustard bran particles through the high shear device causes a breakdown of these particles. Typically, the volume weighted mean diameter of the mustard bran particles is reduced with at least 20%, more preferably with at least 25% and most preferably with 30-90% by the one or more passages through the high shear device.

The mustard bran particles in the aqueous dispersion preferably have a volume weighted mean diameter of more than 500 μm, more preferably of more than 550 μm and most preferably of more than 600 μm.

In accordance with another preferred embodiment, at least 10 vol. % of the bran particles in the aqueous dispersion have a diameter of at least 700 μm, more preferably of at least 900 μm, even more preferably of at least 1000 μm.

The milled suspension that is produced in the present process preferably contains not more than a limited amount of very coarse bran particles. Accordingly, in a preferred embodiment, less than 10 vol. % of the bran particles in the milled suspension have a diameter of at least than 1200 μm, more preferably of at least 1000 μm and most preferably of least 800 μm.

The present process preferably yields a milled suspension in which the mustard bran particles have a volume weighted mean diameter of less than 600 μm, more preferably of less than 500 μm and most preferably of 50-300 μm.

The mustard bran particles in the aqueous dispersion typically have a total Kjeldahl protein (TKP) content of at least 10 wt. % on dry matter, more preferably of least 15 wt. % on dry matter and most preferably of 15 wt. % to 25 wt. % on dry matter.

Due to solubilisation and dispersing of the protein contained in the bran particles of the aqueous dispersion, the TKP content of these bran particles is reduced by the one or more passages through the high shear device.

Due to the aforementioned solubilisation and dispersing of the bran protein, the liquid phase of the milled suspension typically has a TKP content of at least 1 g/l, more preferably of at least 1.5 g/l and most preferably of 2 to 60 g/l.

Preferably, the liquid phase of the milled suspension contains at least 1 g/l, more preferably at least 1.5 g/l and most preferably 2 to 60 g/l of mustard bran protein.

According to a particularly preferred embodiment, at least 25%, more preferably at least 30% and most preferably at least 45% of the total TKP content of the milled suspension is found in the liquid phase.

Besides bran particles and water, the aqueous dispersion may contain other edible ingredients, such as salts and/or acids. Preferably, however, such additional components are absent in the aqueous dispersion or present in relatively low concentrations. Accordingly in a preferred embodiment, the combination of water and mustard bran particles constitutes at least 95 wt. %, more preferably at least 98 wt. % of the aqueous dispersion.

The high shear device that is employed in the present process preferably is a high-pressure homogenizer. High pressure homogenisation (HPH) is a mechanical process, in which fluid material is forced through a narrow gap (the homogenizing nozzle) at high pressure. Preferably a high-pressure homogenizer is used to apply the shear at step b) operating at a pressure drop of at least 200 bar, more preferably of from 300 to 2000 bar, even more preferably of from 350 to 1400 bar and still even more preferably of from 400 to 1100 bar.

In the present process, the dispersion entering the high shear device preferably has a temperature of at least 50 degrees Celsius, more preferably of at least 60 degrees Celsius and most preferably of 70-100 degrees Celsius.

The milled suspension of mustard bran particles bran that is obtained by the present process can suitably be used as such or it can be diluted or concentrated before further use. In accordance with a preferred embodiment, the milled suspension is dried to a water content of less than 20 wt. %, more preferably of less than 15 wt. % and most preferably of less than 12 wt. %. Preferably, the dried suspension is produced in the form of a powder, more preferably a powder having a mass weighted average diameter in the range of 50-2,000 μm.

Examples of drying techniques that can be used to dry the milled suspension include spray drying, drum drying and freeze drying.

Another aspect of the present invention relates to an aqueous suspension comprising 0.5 to 80 wt. % of mustard bran particles originating from the seeds of black mustard (*Brassica nigra*) and/or brown Indian mustard (*Brassica juncea*), said mustard bran particles having a volume weighted mean diameter of less than 600 μm, preferably of less than 500 μm, more preferably of 50-300 μm.

The mustard bran particles are preferably contained in the aqueous suspension in a concentration of 1 to 20 wt. %, more preferably of 2 to 10 wt. %.

In a preferred embodiment, less than 10 vol. % of the bran particles in the aqueous suspension have a diameter of at least than 1400 μm, more preferably of at least 1000 μm and most preferably of least 600 μm.

The liquid phase of the aqueous suspension typically has a TKP content of at least 1 g/l, more preferably of at least 1.5 g/l and most preferably of 2 to 60 mg/l.

Preferably, the liquid phase of the aqueous suspension contains at least 1 g/l, more preferably at least 1.5 g/l and most preferably 2 to 60 g/l of mustard bran protein.

According to a particularly preferred embodiment, at least 25%, more preferably at least 30% and most preferably at least 45% of the TKP content of the aqueous suspension is found in the liquid phase.

The aqueous suspension preferably has a water content of at least 70 wt. %, more preferably of at least 80 wt. % and most preferably of at least 85 wt. %.

Besides bran particles and water, the aqueous suspension may contain other edible ingredients, such as salts and/or acids. Preferably, however, such additional components are absent in the aqueous suspension or present in relatively low concentrations. Accordingly in a preferred embodiment, the combination of water and mustard bran particles constitutes at least 95 wt. %, more preferably at least 98 wt. % of the aqueous suspension.

According to a particularly preferred embodiment, the aqueous suspension is obtained by the process described herein, wherein an aqueous dispersion of mustard bran particles is passed one or more times through a high shear device.

A further aspect of the present invention relates to a food product comprising an aqueous phase, said aqueous phase comprising 0.5 to 15 wt. % of mustard bran particles originating from the seeds of black mustard (*Brassica nigra*) and/or brown Indian mustard (*Brassica juncea*), said mustard bran particles having a volume weighted mean diameter of less than 600 μm, preferably of less than 500 μm, more preferably of 50-300 μm.

Preferably, the aqueous phase of the food product contains 1 to 12 wt. %, more preferably 2 to 10 wt. % of mustard bran particles. Here the concentration of the mustard bran particles in the aqueous phase is expressed as a percentage by weight of the total aqueous phase, included suspended mustard bran particles.

Preferably, the liquid phase of the aqueous phase contains at least 1 g/l, more preferably at least 1.5 g/l and most preferably 2 to 60 g/l of mustard bran protein.

The present food product preferably comprises at least 10 wt. %, more preferably 15-80 wt. %, even more preferably 17-70 wt. % of the aqueous phase containing mustard bran particles.

According to a preferred embodiment, the food product is an oil-and-water emulsion, more preferably oil-in-water emulsion. Examples of oil-in-water emulsions include mayonnaise and dressings. Most preferably, the food product of the present invention is a mayonnaise.

Preferably the oil-in-water emulsion according to the invention comprises edible acid. Said acid refers to regular acids typically used in food emulsions. Preferably the amount of added acid is from 0.1 to 10 wt. %, more preferably from 0.5 to 5 wt. % and even more preferably from 1.0 to 2.0 wt. %. The acid preferably is selected from acetic acid, citric acid, lactic acid, phosphoric acid, and combinations thereof. Acetic acid may be added as a component of vinegar, and citric acid may be added as a component of lemon juice. Preferably the pH of the emulsion according to the invention is from 2.75 to 5.75, more preferably from 2.85 to 5.50 and even more preferably from 3.25 to 4.25.

The oil-in-water emulsion of the present invention preferably contains egg yolk. The emulsion typically contains 0.5-10 wt. %, more preferably 2-8 wt. % and most preferably 3-7 wt. % egg yolk. Here the weight percentage refers to ordinary 'wet' egg yolk. It should be understood that the invention also encompasses the use of lyophilized egg yolk in equivalent amounts.

Preferably, the emulsion according to the present invention contains 10-90 wt. % oil. More preferably, the oil content of the emulsion is in the range of 20-85 wt. %, most preferably in the range of 30-83 wt. %. The oil in the emulsion preferably contains at least 80 wt. %, more preferably at least 90 wt. % of triglycerides.

The food product of the present invention preferably comprises mustard bran in a concentration of 0.05 to 4.0 wt. %, more preferably in a concentration of 0.075 to 2.75 wt. % and most preferably in a concentration of 0.1 to 2.0 wt. %, based on the total weight of the food product.

Yet a further aspect of the present invention relates to a method of producing a food product as described herein, said method comprising mixing the aqueous suspension containing mustard bran particles as defined herein with one or more other food ingredients. In accordance with a particularly preferred embodiment, said one or more other food ingredients include oil.

The invention is further illustrated by the following non-limiting examples.

EXAMPLES

Example 1

60 grams of Oriental mustard bran (*Brassica juncea*), obtained from G.S. Dunn Ltd. (product code 403), was dispersed in 2960 gram of Millipore water (a beaker of 5000 ml was used) at room temperature using a spoon. Next, the dispersion was homogenised using a Silverson (L4RT-A) mixer with a screen with 2 mm holes at 7000 rpm for 5 minutes.

Subsequently the dispersion was further processed in a high pressure homogeniser (PandaPlus 2000 from GEA Niro Soavi) at different pressures, using only the first stage of the homogeniser. During homogenisation the dispersion in the pre-mix tank was stirred to prevent sedimentation of large particles.

The particle size distribution of the homogenised dispersions was determined using a Mastersizer 2000 (Malvern) and compared to that of the non-homogenised dispersion (Reference).

Likewise, the amount of protein that had been released into the aqueous phase of the homonogenised dispersions was measured and compared to that of the non-homogenized reference. To prepare a sample for protein concentration measurements, the sample was subjected to centrifugation (5 min at 10,000 rpm in an Eppendorf® centrifuge). The entire supernatant was taken for analysis, leaving only the dark sediment at the bottom of the Eppendorf® tubes. The protein content was determined on the basis of total nitrogen content. Kjeldahl was applied to determine nitrogen content (Official Methods of Analysis AOAC, 2000). Nitrogen content was then multiplied by a factor 6.25 to arrive at protein content.

The results are shown in Table 1

TABLE 1

| Sample | Homogenisation | D[4, 3] (μm) | d(0, 1) (μm) | d(0, 5) (μm) | d(0, 9) (μm) | Protein content (mg/l) |
|---|---|---|---|---|---|---|
| Reference | None | 885 | 310 | 863 | 1502 | 600 |
| 1 | Silverson | 634 | 20 | 600 | 1325 | 1100 |
| 2 | HPH 100 bar | 573 | 24 | 506 | 1244 | 1200 |
| 4 | HPH 300 bar | 481 | 22 | 400 | 1099 | 1600 |
| 5 | HPH 500 bar | 294 | 14 | 167 | 756 | 1700 |
| 6 | HPH 1000 bar | 91 | 10 | 63 | 213 | 1300 |
| 7 | HPH 1500 bar | 69 | 10 | 45 | 137 | 1300 |

The reduction in protein content that was observed at homogenization pressure of 1000 and 1500 bar is believed to be caused by disaggregation of protein aggregates that are naturally present in mustard bran. These disaggregated proteins then re-aggregate and form larger particles that are subsequently removed during the centrifugation step that is used to prepare the samples for analysis.

The invention claimed is:

1. A process for the manufacture of a suspension of mustard bran particles comprising the following steps:
  a) providing an aqueous dispersion of mustard bran particles originating from the seeds of black mustard (*Brassica nigra*) and/or the seeds of brown Indian mustard (*Brassica juncea*), said mustard bran particles having a volume weighted mean diameter of more than 300 μm;
  b) producing a milled suspension of mustard bran particles by passing the aqueous dispersion one or more times through a high-pressure homogenizer, said high pressure homogenizer being operated at a pressure drop of 300-500 bar,
  wherein the mustard bran particles and water together constitute at least 95 wt. % of the aqueous suspension.

2. The process according to claim 1, wherein the volume weighted mean diameter of the mustard bran particles is reduced with at least 20% by the one or more passages through the high shear device.

3. The process according to claim 1, wherein the mustard bran particles in the aqueous dispersion have a volume weighted mean diameter of more than 500 μm.

4. The process according to claim 1, wherein the aqueous dispersion in step a) contains 0.5 to 80 wt. %, based on the weight of the dispersion, of the mustard bran particles.

5. An aqueous suspension comprising 0.5 to 80 wt. % of mustard bran particles originating from the seeds of black mustard (*Brassica nigra*) and/or brown Indian mustard (*Brassica juncea*), said mustard bran particles having a volume weighted mean diameter of less than 600 μm, wherein at least 25% of the total Kjeldahl protein content of the aqueous suspension is found in the liquid phase, wherein the aqueous suspension with mustard bran particles has been passed one or more times through a high-pressure homogenizer operated at a pressure drop of 300-500 bar; and wherein the mustard bran particles and water together constitute at least 95 wt. % of the aqueous suspension.

6. The aqueous suspension according to claim 5, wherein the suspension has a water content of at least 70 wt. %.

7. The aqueous suspension according to claim 5, wherein the suspension is obtained by the following steps:
  a) providing an aqueous dispersion of mustard bran particles originating from the seeds of black mustard (*Brassica nigra*) and/or the seeds of brown Indian mustard (*Brassica juncea*), said mustard bran particles having a volume weighted mean diameter of more than 300 μm; and
  b) producing a milled suspension of mustard bran particles by passing the dispersion one or more times through the high-pressure homogenizer.

8. A food product comprising an aqueous phase comprising the aqueous suspension of claim 5, said aqueous phase comprising 0.5 to 15 wt. % of mustard bran particles originating from the seeds of black mustard (*Brassica nigra*) and/or brown Indian mustard (*Brassica juncea*), said mustard bran particles having a volume weighted mean diameter of less than 600 μm.

9. The food product according to claim 8, wherein food product comprises at least 10 wt. % of the aqueous phase.

10. The food product according to claim 8, wherein the food product is an oil-in-water emulsion.

11. The food product according to claim 8, wherein the food product is a mayonnaise.

12. A method of producing a food product according to claim 8, said method comprising mixing one or more other food ingredients with an aqueous suspension comprising 0.5 to 80 wt. % of mustard bran particles originating from the seeds of black mustard (*Brassica nigra*) and/or brown Indian mustard (*Brassica juncea*), said mustard bran particles having a volume weighted mean diameter of less than 600 μm, wherein at least 25% of the total Kjeldahl protein content of the aqueous suspension is found in the liquid phase.

* * * * *